Sept. 3, 1957 R. VOSTREZ 2,805,079
ROCKING ACTION WAGON CHASSIS
Filed Aug. 10, 1955 2 Sheets-Sheet 2

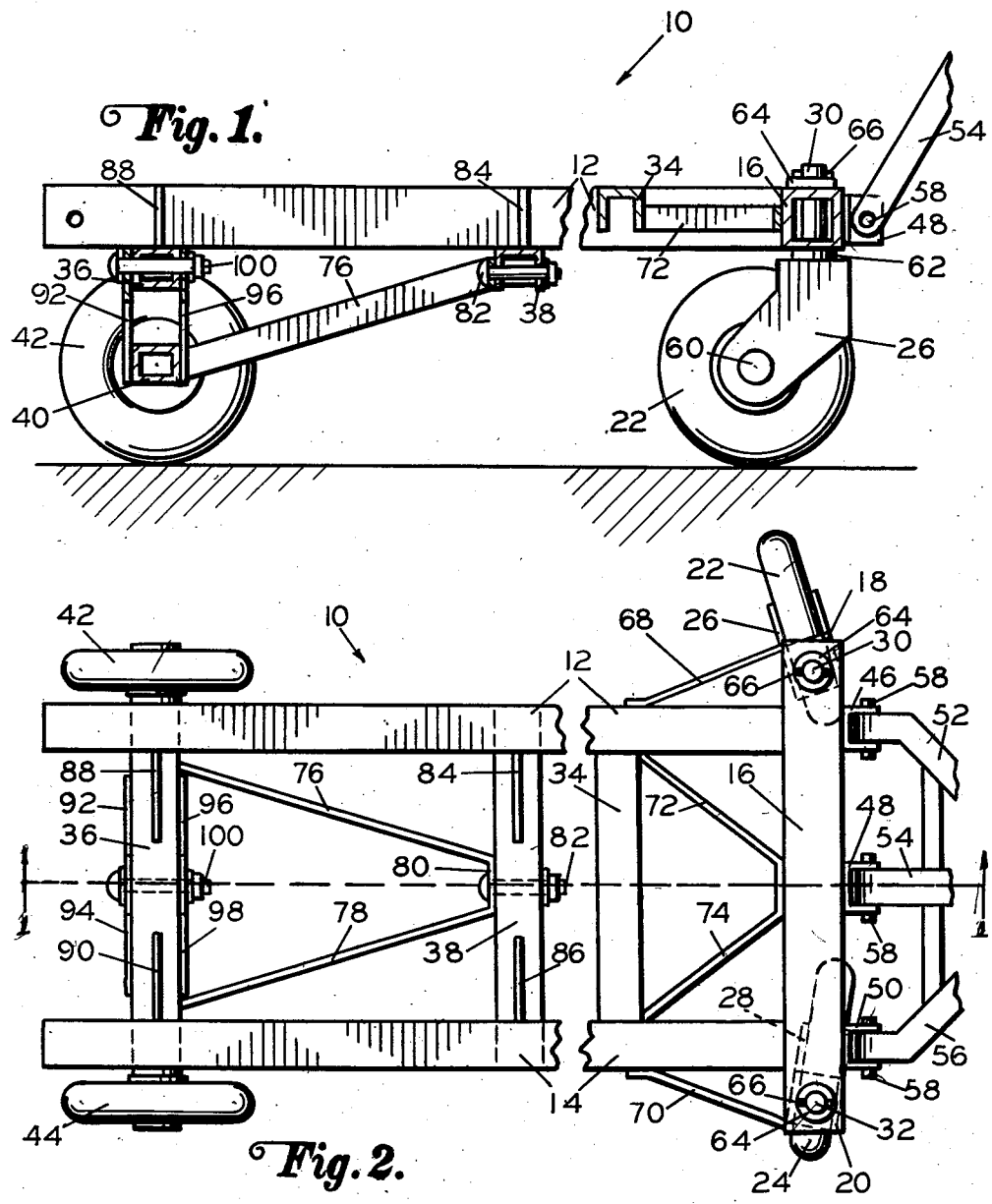

INVENTOR.
Robert Vostrez
BY Arthur H. Sturges
Attorney

United States Patent Office 2,805,079
Patented Sept. 3, 1957

2,805,079

ROCKING ACTION WAGON CHASSIS

Robert Vostrez, Western, Nebr.

Application August 10, 1955, Serial No. 527,440

1 Claim. (Cl. 280—111)

This invention relates to vehicles and particular vehicles used primarily on farms, and in particular a wagon chassis having caster type front wheels pivotally mounted to turn about vertically positioned axes in the ends of a stationary front beam to which a tongue is connected, and rear wheels carried by a rear axle beam pivotally mounted to turn in a transverse vertically disposed plane wherein torsional strains resulting from one side of one end of the vehicle passing over a rock or other obstruction are eliminated, wherein the chassis is retained in alignment to facilitate backing, and wherein the wagon is adapted to turn in a comparatively short radius.

The purpose of this invention is to provide a chassis for a wagon in which the wagon box or body holding elements remain in a horizontal plane continuously thereby relieving the box of torsional strains resulting from twisting and bending.

Various types of wagon gear and chassis have been provided particularly for farm wagons, however, in substantially all gear of this type the front wheels turn about a kingpin and the rear wheels are mounted on a common axle that is rigid with the frame or chassis. With this construction a box positioned on the chassis is subjected to twisting or torsional strains whereby connections of the parts are strained and sometimes broken. Furthermore with this type of construction the turning radius is limited and backing is difficult.

With this thought in mind this invention contemplates improvements in the construction of a wagon chassis wherein the front wheels are mounted with caster-type elements in extended ends of a front bolster or beam and the rear wheels are pivotally mounted about a horizontally disposed axis whereby the bed of the box positioned on the chassis remains in a horizontal plane and wherein the wagon is adapted to turn on a radius equal to the distance between the front and rear axles of the chassis.

The object of this invention is, therefore, to improve the construction of chassis for wagon boxes whereby the bed of the box remains in a horizontal plane as the wagon travels over rough terrain.

Another object of the invention is to provide a chassis for a wagon box in which the box is carried on a rigid rectangular shaped frame whereby the box is relieved of torsional strains and stresses.

Another important object of the invention is to provide a chassis for a wagon in which the front wheels are provided with caster-like mountings which make it possible for the wagon to turn on a short radius.

It is yet another object of the invention to provide a wagon chassis in which front and rear portions thereof are rigidly connected so that the front wheels track with the rear wheels in backing, thereby making backing easy.

A further object of the invention is to provide a chassis for a wagon in which the rear wheels are mounted to twist about a horizontal longitudinally disposed axis so that one wheel may ride over a hummock, rock, or the like without the twisting action being transmitted to the box or body of the wagon.

A still further object is to provide an improved chassis for a wagon in which torsional strains resulting from the wheels riding over uneven surfaces are absorbed in the chassis and not transmitted to the box in which the chassis is of a simple and economical construction.

With these and other objects and advantages in view the invention embodies a wagon chassis having longitudinally disposed side beams connected with end and intermediate beams, with front wheels carried in caster-like yokes pivotally mounted in extended ends of a front beam which provides a bolster at the front of the wagon, with tongue mounting elements on said bolster, and with rear wheels rotatably mounted on ends of an axle housing which is pivotally mounted on the chassis with a horizontally positioned longitudinally disposed pin, whereby the wheels are free to swing upwardly and downwardly with a rocking action.

Other features and advantages of the invention will appear from the following description taken in connection with the drawings, wherein:

Figure 1 is a longitudinal section through a wagon chassis taken substantially on line 1—1 of Figure 2.

Figure 2 is a plan view of the wagon chassis shown in Figure 1, also with parts of the chassis and tongue broken away.

Figure 4 is a rear elevational view of the improved chassis with the wheels shown in full lines as they appear on a flat surface and with the parts shown in broken lines in the positions they assume as one wheel passes over a hummock or the like.

Figure 3:
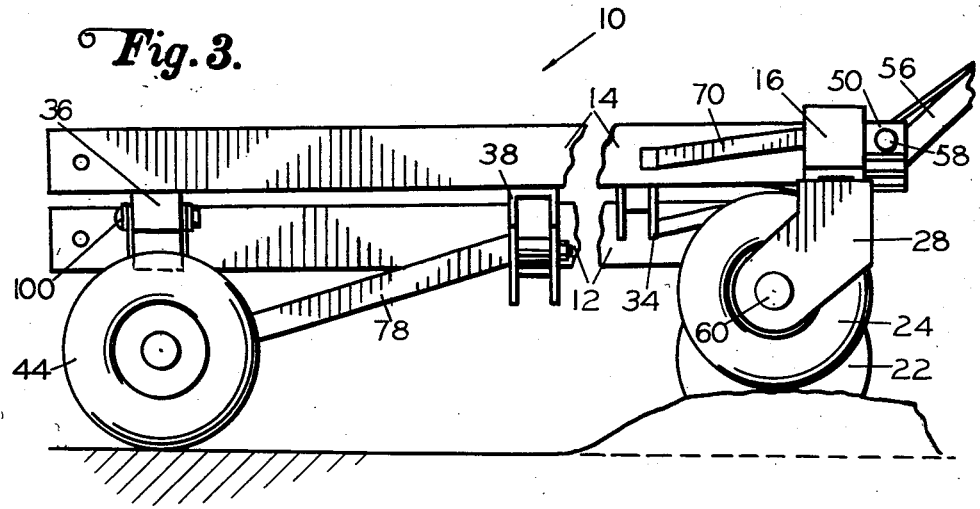
Figure 3 is a side elevational view of the chassis, also with parts broken away, illustrating the positions of the parts with one of the front wheels riding over a hummock or rock.

While one embodiment of the invention is illustrated in the above referred to drawings, it is to be understood that they are merely for the purpose of illustration, and that various changes in construction may be resorted to in the course of manufacture in order that the invention may be utilized to the best advantage according to circumstances which may arise without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 longitudinally disposed side beams, rectangular-shaped in cross section, numeral 16 a front beam or bolster, also rectangular-shaped in cross section, secured, such as by welding to the forward ends of the side beams and having ends 18 and 20 extended beyond the side beams, numerals 22 and 24 front wheels mounted in yokes 26 and 28 which are pivotally mounted by pins 30 and 32 in the ends 18 and 20, respectively, of the beam 16, numeral 34 a cross beam positioned in the forward part of the chassis, numeral 36 an upper cross beam connecting rear ends of the side beams and positioned against under surfaces thereof, numeral 38 an intermediate cross beam spaced forwardly from the beam 36 and also positioned against the under surfaces of the side beams, numeral 40 a rear axle beam spaced below the beam 36 providing a rear axle housing, and numerals 42 and 44 rear wheels rotatably mounted on ends of the rear axle housing.

The forward surface of the front cross beam 16 is provided with U-shaped brackets 46, 48, and 50 in which sections 52, 54 and 56 of a tongue are pivotally mounted with pins 58, and with the tongue connected directly to the beam the forward end of the chassis follows the tongue turning on a radius, the center of which is on the center of the rear axle.

The front wheels 22 and 24 are rotatably mounted in the yokes 26 and 28, respectively, by pins 60, and the pins 30 and 32 extended upwardly from the yokes are pivotally mounted in the ends 18 and 20 of the beam 16. Bearings 62 are provided between upper surfaces of the yokes and under surfaces of the ends 18 and 20 of the beam, and similar bearings 64 are provided on upper ends of the pins and above the ends of the beam. The caster-like mountings are retained in openings in the ends of the beam with suitable keepers, such as cotter pins 66.

The ends 18 and 20 of the beam 16 are supported by braces 68 and 70 from the side beams 12 and 14, respectively, and the center of the beam 16 is supported with diagonally disposed braces 72 and 74. The beam 40, providing the rear axle housing, is supported from the cross beam 38 with braces 76 and 78, the forward ends of which are connected with a member 80, and the forward ends are pivotally connected to the beam 38 with a bolt 82. The beam 38 is supported from the side beams 12 and 14 with gusset plates 84 and 86, and similar gusset plates 88 and 90 reinforce the connections of the ends of the beam 36 to the side beams. The cross beams 34 and 38 are channel-shaped in cross section, and the beams 36 and 40 are rectangular-shaped in cross section similar to the beam 16 and also similar to the side beams.

Figure 4:
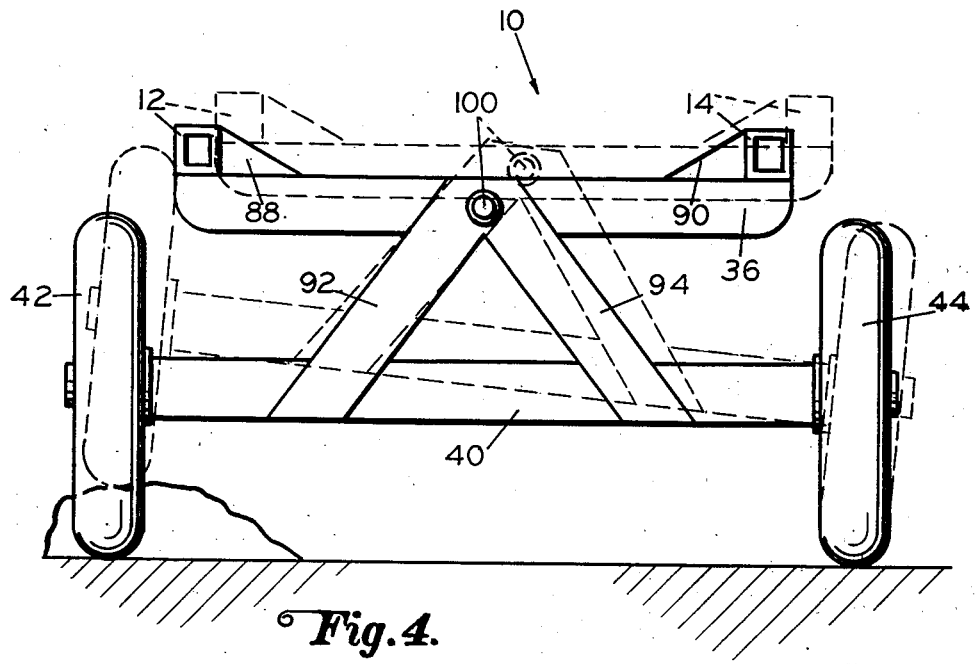

The rear axle beam 40 is connected to the cross beam 36 with diagonally disposed bars 92 and 94 at one side and 96 and 98 at the opposite side, and the upper ends of the bars are connected with a bolt 100 to the beam 36 whereby a pivotal or rocking action of the rear wheel mounting is provided, as illustrated in Figure 4. The wheels 42 and 44 are rotatably mounted on the ends of the rear axle beam 40 by conventional means.

With the casters at the front and rear wheels pivotally mounted on a longitudinal axis both the forward and rear ends of chassis are adapted to remain in horizontally disposed positions with either the front or rear wheels riding over obstructions in a field or roadway.

With the parts assembled as shown and described the side and cross beams provide a rigid structure and a wagon box positioned thereon remains in a common plane continuously as the wagon is used so that the box is not subjected to stresses and strains resulting from wheels of the chassis riding over uneven surfaces, as illustrated in Figures 3 and 4. The caster-like front wheel mountings make it possible to turn the wagon on a radius equal to the distance between the front and rear axles, and the rigid frame facilitates backing.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to, in actual practice, if desired.

Having now described the invention that which is claimed to be new and desired to be procured by Letters Patent, is:

In a wagon chassis, the combination which comprises spaced hollow square longitudinally disposed beams, a cross beam extended across the forward ends of the longitudinally disposed beams, the ends of the cross beam being extended beyond the longitudinally disposed beams, casters having wheels with vertically disposed pins offset from centers of the wheels and extended upwardly therefrom, the casters being positioned with the vertically disposed pins extended through and rotatably mounted in the extended ends of the cross beam, the caster wheels being free to swing about the pins, U-shaped brackets mounted on the forward side of the cross beam providing attaching elements for a tongue, an upper cross beam positioned against the under surface of the longitudinally disposed beams and spaced forwardly from the rear ends of said beams, a rear axle beam positioned below the upper cross beam, diagonally positioned bars extended upwardly from the rear axle beam, said bars being in the form of a V and the vertex of the V being extended upwardly, a pin extended through the vertex of the V and also through the upper cross bar pivotally mounting the rear end of the chassis on the rear axle beam, an intermediate beam positioned against the under surfaces of the longitudinally disposed beams, converging bars extended from the rear axle beam to the intermediate beam, and a pin pivotally connecting the converging bars to the intermediate beam, the pin connecting the converging bars to the intermediate beam being aligned with the pin connecting the vertex of the diagonally positioned bars to the upper cross beam.

References Cited in the file of this patent

UNITED STATES PATENTS

| | | |
|---|---|---|
| 664,599 | Weir | Dec. 25, 1900 |
| 1,221,997 | Koehler | Apr. 10, 1917 |
| 2,510,424 | Shook | June 6, 1950 |
| 2,669,461 | Raney | Feb. 16, 1954 |